J. G. LEFFINGWELL.
Lantern.
No. 47,212.  Patented April 11, 1865.
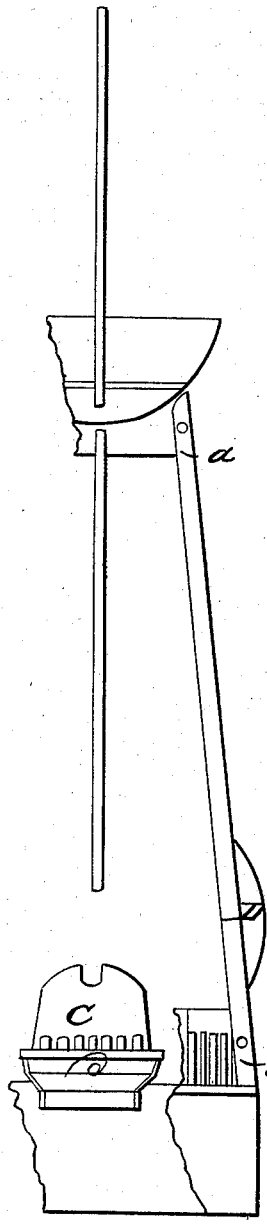
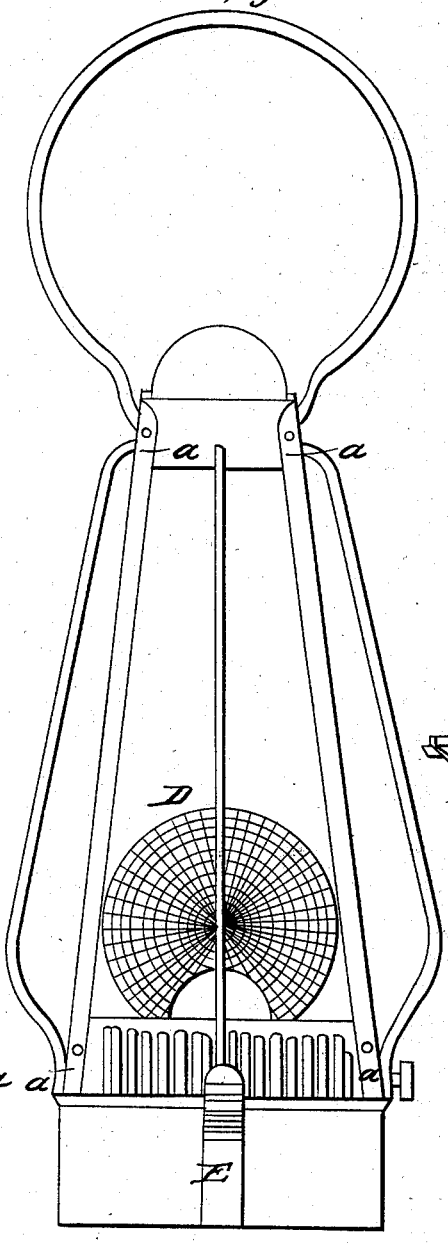

UNITED STATES PATENT OFFICE.

JOHN G. LEFFINGWELL, OF NEWARK, NEW JERSEY.

IMPROVEMENT IN LANTERNS.

Specification forming part of Letters Patent No. 47,212, dated April 11, 1865.

*To all whom it may concern:*

Be it known that I, JOHN G. LEFFINGWELL, of Newark, in the county of Essex and State of New Jersey, have invented a new and Improved Mode of Constructing Lanterns; and I do hereby declare the following to be a full and exact description thereof, reference being had to the accompanying drawings, and to the letters of reference marked thereon.

The nature of my invention consists in putting the parts of lanterns together by means of rivets or eyelets and without the use of solder, or with the use of as little solder as possible; also, in constructing the lamp and the lantern in such a manner that they may be united and separated with ease, and also in constructing a cup in the place of the ordinary collar for the purpose of holding the burner in the lamp, and at the same time have the stem of the ratchet-wheels in its proper place, so that it shall not interfere with the necessary movements of the lantern and lamp.

To enable others skilled in the art to make and use my invention, I will proceed to describe its construction and operation.

I construct my lantern in a quadrangular form, but smaller at the top than at the bottom. Three sides of my lantern are made of glass and the other of tin or other suitable metal.

In the accompanying drawings, Figure 1 represents a longitudinal vertical section of my lantern. Fig. 2 is a transverse section of the same broken off so as to show the side of the burner in the lamp. Fig. 3 is the burner and stem of the ratchet-wheels.

In order to hold the glass sides and front of my lantern in their proper places, I use two upright posts, of tin or other suitable thin metal, bent into a triangular shape, so as to form square corners around the edges of the glass, and riveted at the top to transverse pieces of similar metal, that serve as a stay or sash for the same glass, and I also rivet and solder said posts, at the bottoms thereof, to like transverse pieces of metal, upon which the said glass is supported; or I may omit soldering altogether. These rivets appear upon the drawings, (marked $a\,a$,) and they may be either solid or in the shape of eyelets.

My object in using rivets instead of solder in uniting the parts is to prevent the heat from the burner from unsoldering the parts united, as is often done in lanterns made in the ordinary method.

My object in using the posts above described is to avoid the waste in stock there would be if the parts to receive the glass were cut out and bent down, as is usually done where glass forms only two sides of the lantern. By using these posts and riveting the same all waste of stock is avoided.

For the purpose of holding the lantern and the lamp together I use two hooks or flanges, one of which is constructed on the lower part of the back or metal side of the lantern, and the other on the back edge of the top of the lamp, as shown in Fig. 1, (marked B.) When the lantern is hooked to the lamp on the back side and pushed down against the spring, (marked E, in Fig. 1.) the spring catches over the projection on the bottom of the lantern and makes it secure.

In order to fasten the burner to the lamp and at the same time keep the stem of the ratchet-wheels thereof in its proper place, so as not to interfere with adjusting or removing the lantern, I make a cup to serve in the place of a collar, in which the burner is placed. This cup I make with a lug on each side, as shown in Fig. 2, and marked C. These lugs have a slight spring, so that when the burner is set into the cup and turned slightly the spindle of the ratchet-wheels is forced under the lugs and held there firmly. These lugs can be made more cheaply than collars, as they may be cut out in blank in the proper shape.

I am aware that a collar or cup has been used in connection with a small wire hook soldered into the top of the lamp; but as I make my cup it is all of one piece of metal, and one soldering will answer the purpose, instead of two, as in the other method mentioned. By this method of construction I avoid the necessity of using the top of the lamp for a rest for the stem of the ratchet-wheels, as I make the same rest on the lugs.

In the back or metal part of my lantern I strike up a reflector, as shown in Fig. 1 by the letter D. This may be either plain or corrugated; but I prefer to strike it up plain, as it is more easily kept clean in that form.

What I claim as new and of my invention, and desire to secure by Letters Patent, is—

1. The lug C, when used in the manner and for the purposes specified, substantially as described.

2. My device for attaching the lamp to the lantern part by means of the hooks or flanges represented, working in combination with a spring, substantially as set forth.

3. The lantern as it stands, with its several devices—to wit, lugs, hooks or flanges, and spring, fastening with rivets, reflector, and posts—combined and arranged substantially as described.

JOHN G. LEFFINGWELL.

Witnesses:
J. C. SMITH,
FRED B. GINN.